United States Patent [19]
Mirov

[11] Patent Number: 6,008,682
[45] Date of Patent: *Dec. 28, 1999

[54] CIRCUIT AND METHOD FOR SELECTIVELY ENABLING ECL TYPE OUTPUTS

[75] Inventor: Russell N. Mirov, Los Altos, Calif.

[73] Assignee: Sun Microsystems, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/664,171

[22] Filed: Jun. 14, 1996

[51] Int. Cl.$^6$ ....................................................... H03L 5/00
[52] U.S. Cl. .............................. 327/333; 327/108; 326/30
[58] Field of Search ..................................... 327/333, 379, 327/391, 108–112, 432; 326/30, 62–81

[56] References Cited

U.S. PATENT DOCUMENTS

| | | | |
|---|---|---|---|
| 4,888,501 | 12/1989 | Sanwo et al. | 326/73 |
| 4,912,341 | 3/1990 | Naghshineh | 326/30 |
| 5,132,561 | 7/1992 | Coffey et al. | 326/30 |
| 5,508,665 | 4/1996 | Chan et al. | 331/117 D |
| 5,515,005 | 5/1996 | Yoshioka | 330/255 |
| 5,523,722 | 6/1996 | Nakano et al. | 331/107 A |
| 5,581,201 | 12/1996 | Sonner et al. | 327/333 |

FOREIGN PATENT DOCUMENTS

| | | | |
|---|---|---|---|
| 4-268819 | 9/1992 | Japan | 326/30 |

*Primary Examiner*—Kenneth B. Wells
*Attorney, Agent, or Firm*—Blakely Sokoloff Taylor & Zafman

[57] ABSTRACT

A clock circuit for selectively enabling a clock signal to be propagated, via a transmission line, to an option module when the module is coupled to the clock circuit, and for preventing propagation of the clock signal through the transmission line when the option module is decoupled from the clock circuit. The clock circuit includes a clock driving element employed within a first module and a clock receiving element employed within a second module. The clock driving element includes a clock driver, normally an amplifier connected to at least one emitter-follower transistor. A pull-up resistor is coupled to the emitter of the transistor so that, when the option module is decoupled from the transmission line, the pull-up resistor applies voltage sufficient to turn-off the transistor. Otherwise, the pull-up resistor has no effect on the clock circuit.

18 Claims, 7 Drawing Sheets

CIRCUIT AND METHOD FOR SELECTIVELY ENABLING ECL TYPE OUTPUTS

BACKGROUND OF THE INVENTION

1. Field of the Invention

The present invention relates generally to the field of electronics. More particularly, the present invention relates to a clock circuit that selectively drives a clock signal to an option module via a transmission line when the option module is coupled to the clock circuit, and prevents propagation of the clock signal through the transmission line when the option module is decoupled from the clock circuit.

2. Description of Art Related to the Invention

It is well known that many electronic systems (e.g., computers, workstations, mainframes, etc.) are designed with a number of printed circuit boards which are electrically coupled together. One of these printed circuit boards, referred to as the "motherboard", includes a clock generation circuit (e.g., crystal oscillator) that produces a "master clock signal", being the main clock utilized by the electronic system. The master clock signal is replicated to generate a plurality of copies, which are referred to as "system clock signals". Each of the system clock signals is driven to different portions of the electronic system by a clock driver. For those outdated system architectures utilizing low-speed clock frequencies (e.g., 33 megahertz "MHz" or less), the clock drivers typically employ Transistor-Transistor logic ("TTL") or Complementary Metal-Oxide Silicon ("CMOS") logic.

Of the plurality of system clock signals produced, a number of these system clock signals may be routed by transmission lines to removable option modules such as graphics cards, processor cards and the like. Each transmission line may include, but are not limited to a first segment of a printed trace line implemented on the motherboard, a second segment of a printed trace line implemented on an option module. Of course, the connectors coupling the first and second segments of printed trace lines influence the impedance of the transmission line. When coupled to the motherboard, an option module provides enhanced functionality to the electronic system.

In order to preserve signal integrity of each system clock signal and mitigate the effects caused by electromagnetic interference "EMI", each transmission line must be terminated. Such termination may be accomplished, for example, by placing a termination resistor proximate to a load receiving a system clock signal. The termination resistor is configured with impedance equal to that of the transmission line and is coupled to both ground and the transmission line.

Since it is desirous for the termination resistor to be in close proximity to the load, the termination resistor usually is placed on the option module. Thus, when the option module is implemented within the electronic system by connecting the option module to one of the connectors, the transmission line associated with the connector is properly terminated. However, when the option module is removed from the electronic system, the transmission line associated with that option module has no termination. Hence, the transmission line radiates EMI along the transmission line creating difficulties in meeting Federal guidelines on EMI limits produced by computers and other electronic systems.

For many years, this problem has been overcome by connecting a pair of reversed biased diodes (e.g., Shottkey diode clamp) to the transmission line in such a fashion to maintain the voltage of the system clock signal between two voltage parameters. For example, anode of a first diode may be coupled to a supply voltage reference (e.g., a +5.0 volt "V" supply) and a cathode of a second diode may be coupled to a ground reference. As a result, the first and second diodes maintain the voltage parameters ranging from approximately +5.4 V and approximately −0.4 V for a CMOS clock driver, taking into account forward conduction voltage of the diode being equal to approximately 0.4 V.

With advancements in the electronic systems resulting in the use of high clock frequencies (e.g., over 100 MHz), the clock drivers are being implemented with either Emitter Coupled Logic ("ECL") or Positive Emitter Coupled Logic ("PECL"). Thus, the conventional architecture of the clocking circuitry now has become subject to a number of disadvantages. One primary disadvantage is that the conventional clocking circuitry fails to eliminate propagation of a clock signal along the transmission lines when the option module is removed from the electronic system. As a result, as the clocking frequency used by the electronic system increases, the EMI radiating from the transmission lines increases. Therefore, it is more difficult to design faster electronic systems employing conventional clocking circuitry due to an increase in skew between the system clock signals. Likewise, it is more difficult to meet EMI limits imposed by Federal regulations.

Hence, it would be advantageous to design a clock circuit which would provide a low-skew clock signal to the option module via one or more transmission lines when the option module is electrically coupled to the motherboard, and alternatively, discontinue supplying the low-skew clock signal to the connector reserved for the option module after the option card is removed therefrom by deactivating the transmission line(s).

SUMMARY OF THE INVENTION

A clock circuit selectively enabling a clock signal to be propagated, via a transmission line, to an option module only when the module is coupled to the clock circuit. Otherwise, when the option module is decoupled from the clock circuit, the clock signal is precluded from propagating through the transmission line(s). As a result, EMI radiation is substantially diminished.

The clock circuit includes a clock driving element employed within a first module and a clock receiving element employed within a second module. The clock driving element includes a clock driver, normally an amplifier connected to at least one emitter-follower transistor. A pull-up resistor is coupled to the emitter of the emitter-follower transistor. Thus, when the option module is decoupled from the transmission line, the pull-up resistor applies voltage sufficient to turn-off the transistor. Otherwise, the pull-up resistor has no effect on the clock circuit.

BRIEF DESCRIPTION OF THE DRAWINGS

The features and advantages of the present invention will become apparent from the following detailed description of the present invention in which.

DESCRIPTION OF THE PREFERRED EMBODIMENT

The present invention describes a selective clock circuit and its associated communication scheme which selectively enables transmission of a clock signal to an option module via transmission line(s) when implemented within an electronic system, and disables transmission of the clock signal when the option module is removed from the electronic system by deactivating the transmission line(s). Although specific circuitry has been set forth, it is obvious that these specific details are not required to practice the invention. Likewise, well known circuits, devices and the like may not be discussed in order to avoid obscuring the present invention.

In the detailed description, a number of terms are used herein to describe certain characteristics or qualities. For example, circuitry employing Positive Emitter Coupled Logic ("PECL"), but capable of employing Emitter Coupled Logic ("ECL"), may be referred to as "(P)ECL logic." One or more transmission lines may be referred herein as "transmission line(s)".

Figure 1:
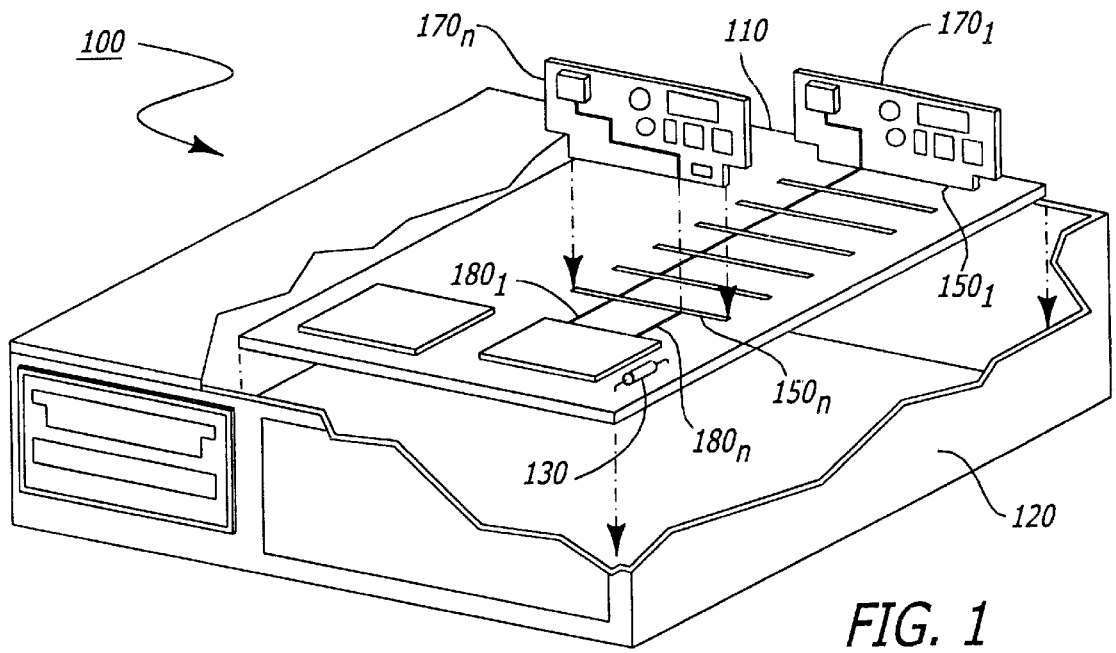
FIG. 1 is a perspective view of an embodiment of the present invention implemented within a first embodiment of an electronic system including a plurality of option modules coupled to the motherboard through a corresponding pair of connectors.
Figure 2:
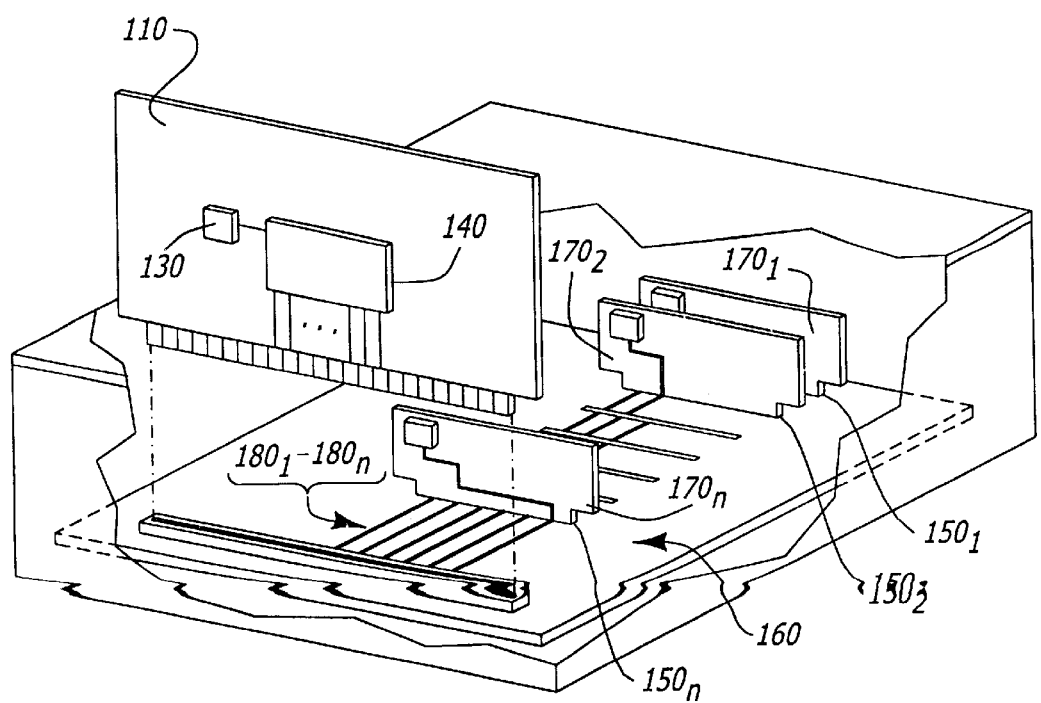
FIG. 2 is a perspective view of an embodiment of the present invention implemented within a second embodiment of an electronic system including a plurality of option modules electrically coupled to the motherboard through a corresponding pair of connectors.

Referring to FIG. 1, a simplified embodiment of an electronic system (e.g., computer, workstation, mainframe, etc.) utilizing the present invention is shown. The electronic system 100 comprises a motherboard 110 implemented within a chassis 120 of the electronic system 100. The motherboard 110 comprises a clock generation element 130, a clock driving element 140, and a plurality of connectors $150_1$–$150_n$ ("n"≧2, "n" being a whole number) as shown. It is contemplated, however, that only one connector may be used or that the connectors $150_1$–$150_n$ may be employed as part of a backplane architecture 160 as shown in FIG. 2. Thus, the motherboard 110 is a removable module coupled to the backplane 160 which electrically couples other removable modules.

Referring still to FIGS. 1–2, each of the plurality of connectors $150_1$–$150_n$ is configured to receive a particular type of option module $170_1$–$170_n$ such as, for example, a memory module, a graphics module, a processor module and the like. The processor module would provide multiple processor capability to the electronic system 100, while the graphics module would provide video capability. The memory module would provide additional memory capability.

The clock generation element 130 includes, but is not limited to, a crystal oscillator or a phase-locked loop based circuit. The clock generation circuit 130 produces a master clock signal and transfers that signal to the clock driving element 140 which replicates the master clock signal forming a plurality of system clock signals. These system clock signals are capable of being transferred through trace lines $180_1$–$180_n$. Preferably, these trace lines $180_1$–$180_n$ are arranged in parallel and in close proximity to one another in order to reduce noise susceptibility and skew between the system clock signals.

The clock driving element 140 includes a plurality of clock drivers (not shown) preferably processed on the same silicon die. Such processing reduces skew associated with the system clock signals produced by the clock drivers, resulting from, for example, environmental changes applied to the IC package (temperature variations, moisture, etc.) as well as voltage or current changes applied to the silicon die itself.

Figure 3:
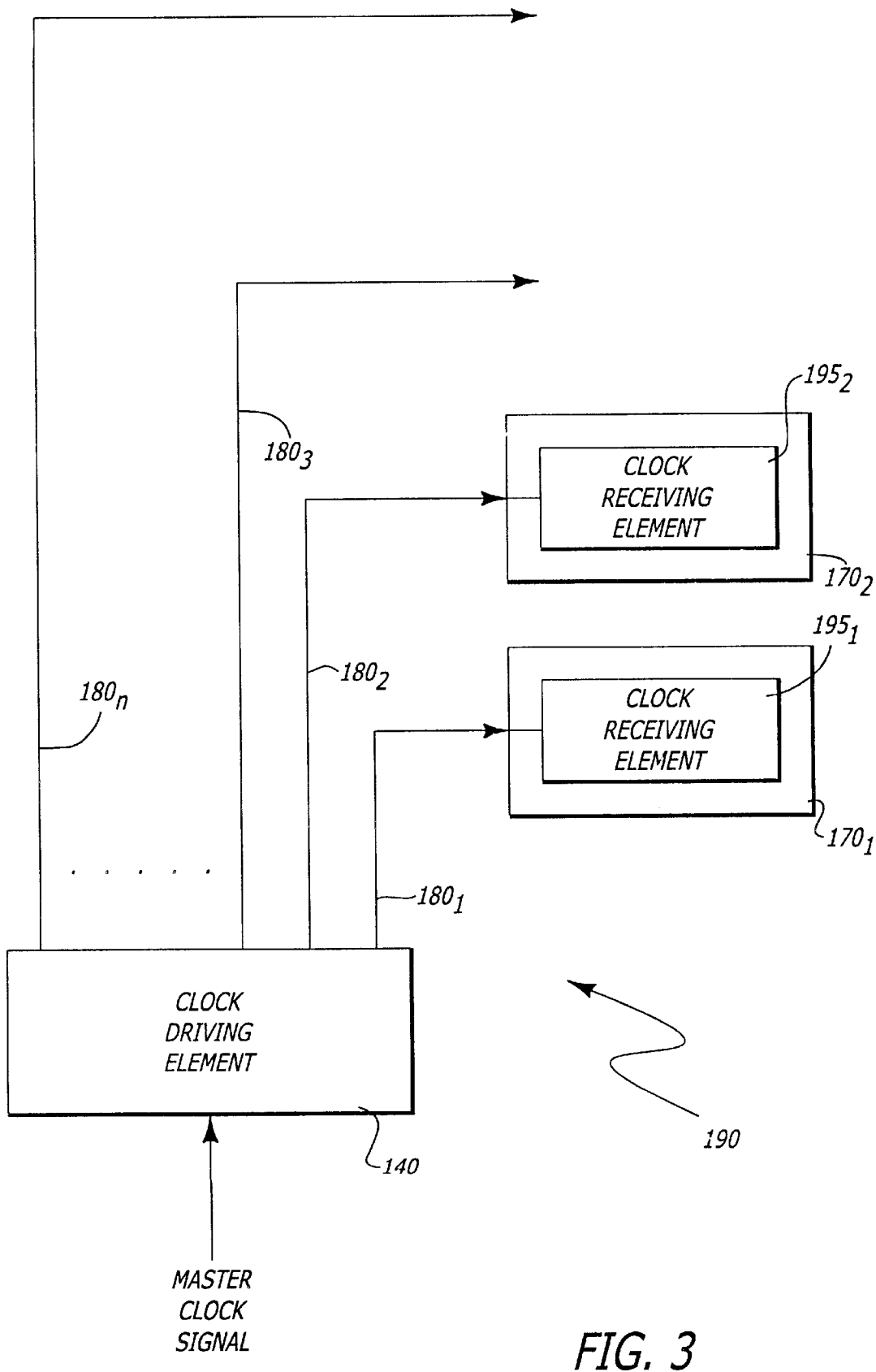
FIG. 3 is a block diagram of an embodiment of a selective clock circuit including the clock driving element of FIG. 1 and a pair of clock receiving elements associated with two connected option modules of the plurality of option modules.

Referring now to FIG. 3, the selective clock circuit 190 is illustrated as circuitry which enables transmission of system clock signals to option modules implemented within the electronic system, such as option modules $170_1$ and $170_2$. Likewise, the selective clock circuit 190 disables transmission of system clock signals when its associated option module is removed from the electronic system. For example, system clock signals normally propagated along trace lines $180_3$–$180_n$ may be set to a voltage within a constant, predetermined voltage range such as 5 V or 3.3 V for PECL or ground for ECL.

The selective clock circuit 190 includes the clock driving element 140 and a plurality of clock receiving elements $195_1$ and $195_2$, which are implemented on option modules $170_1$ and $170_2$. The clock driving element 140 includes a plurality of clock drivers (not shown) of which two clock drivers are transferring system clock signals to its uniquely dedicated clock receiving elements $195_1$ and $195_2$. It is contemplated, however, that one clock driver may be configured to drive system clock signals to multiple clock receiving elements.

Figure 4:
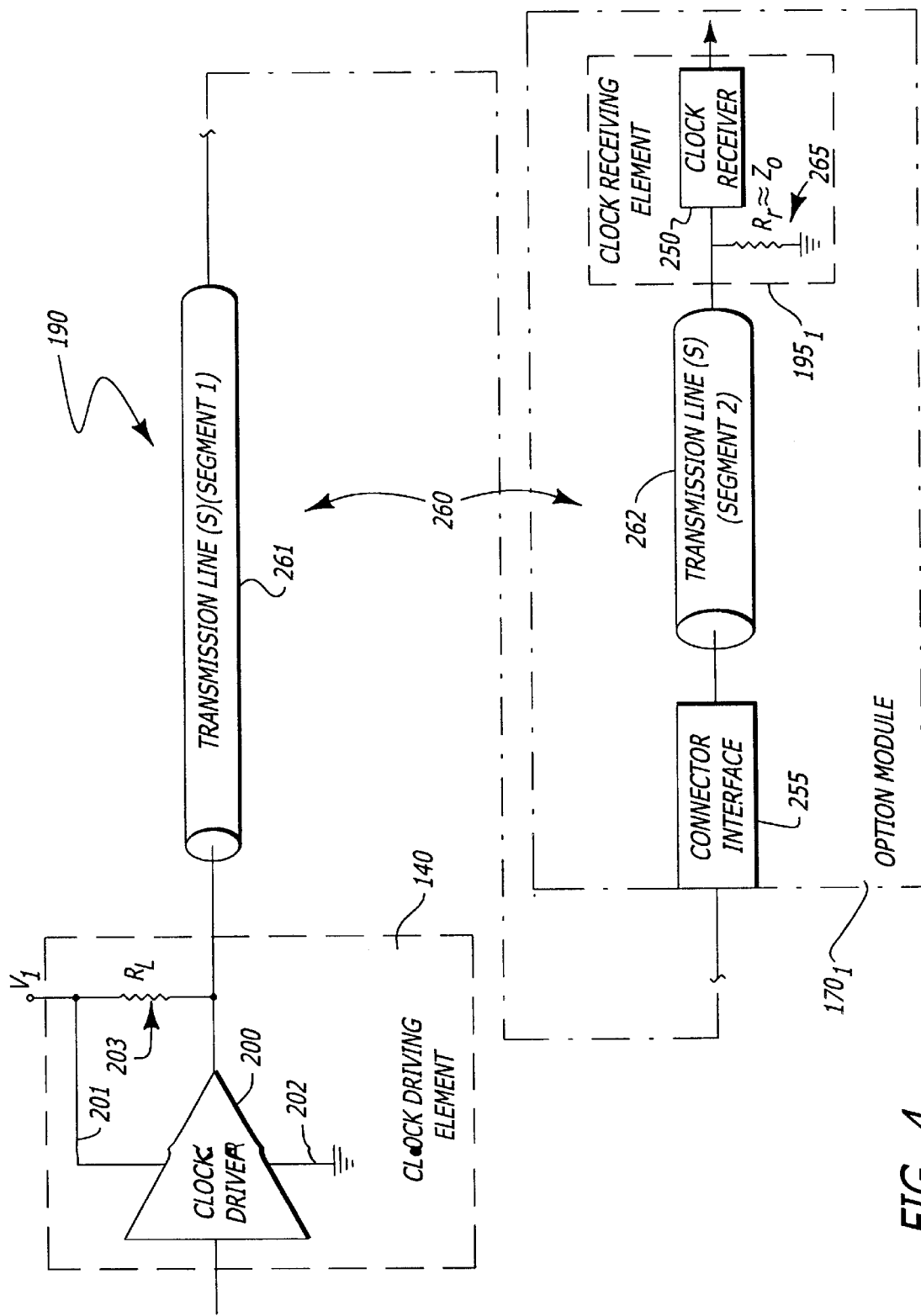
FIG. 4 is a block diagram illustrating in greater detail the embodiment of the selective clock circuit of FIGS. 1–3.

Referring now to FIG. 4, the selective clock circuit 190 supporting at least one option module is shown with a clock driving element 140, including a clock driver 200, in communication with a clock receiving element $195_1$ including a clock receiver 250. Both the clock driver 200 and the clock receiver 250 are constructed with PECL or ECL (i.e., "(P)ECL") logic and may be either "single ended" or "differential". For single-ended (P)ECL logic, one communication line is used to transfer clocking signals between the clock driver 200 and the clock receiver 250. For differential (P)ECL logic, two communication lines are used to transfer clocking signals in which the clock receiver 250 observes the differences between the two communication lines.

Of course, since (P)ECL logic produces low-amplitude clocking signals (e.g., approximately 0.80 V in amplitude), single-ended (P)ECL logic is more susceptible to signal corruption by crosstalk and other conditions than differential (P)ECL logic. Therefore, selection of ECL or PECL logic is a design choice. Furthermore, the advantage in using (P)ECL instead of TTL or CMOS logic is that (P)ECL logic outputs low-skew signals (e.g., approximately 0.05 nanoseconds "ns"), is capable of driving low-impedance transmission lines (e.g., characteristic impedances of 25 ohms "Ω") and can withstand loading effects of the option modules.

As shown, the clock driver 200 is coupled to a connector interface 255 of an option module $170_1$ through a first segment 261 of transmission line(s) 260. The clock driver 200 receives a first reference having "$V_1$" volts (e.g., normally +5 V ≧, $V_1$ ≧2 V for PECL logic, or generally ground for ECL logic) from signal line 201 and second reference through signal line 202 (e.g., ground when using PECL logic as shown, or ranging between −2 V and −5 V for ECL logic). A pull-up resistor 203 is coupled to both the first segment 261 of transmission line(s) 260 at the output of the clock driver 200 and to a voltage source (e.g., power bus) supplying $V_1$. The pull-up resistor 203 is configured to have a resistance "$R_L$" substantially greater than the collective characteristic impedance of transmission line(s) 260 being equal to $Z_0$ (e.g., 100Ω≦$Z_0$≦15Ω). For example, the resistance "$R_L$" of the pull-up resistor 203 may range from 1 kΩ to 10 kΩ, although this range is not exclusive.

The connector interface 255 includes a male and female connection pair or any other connection mechanism. The connector interface 255 couples the first segment 261 of the transmission line(s) 260 to a second segment 262 of the transmission line(s) 260 used to route a system clock signal to the clock receiver 250. Placed in close proximity with the clock receiver 250 to avoid a lengthy unterminated segment of the transmission lines coupling the clock receiver 250, a termination circuit 265 is coupled between the second segment 262 of the transmission line(s) and ground in order to terminate the transmission line(s) 260 to reduce EMI effects therefrom. The termination circuit 265 is shown as a resistor 266 having a resistance "$R_T$" equal to impedance $Z_0$. However, the termination circuit 265 may include a "Thevenin" circuit or any circuit functioning in a similar manner.

Figure 5:
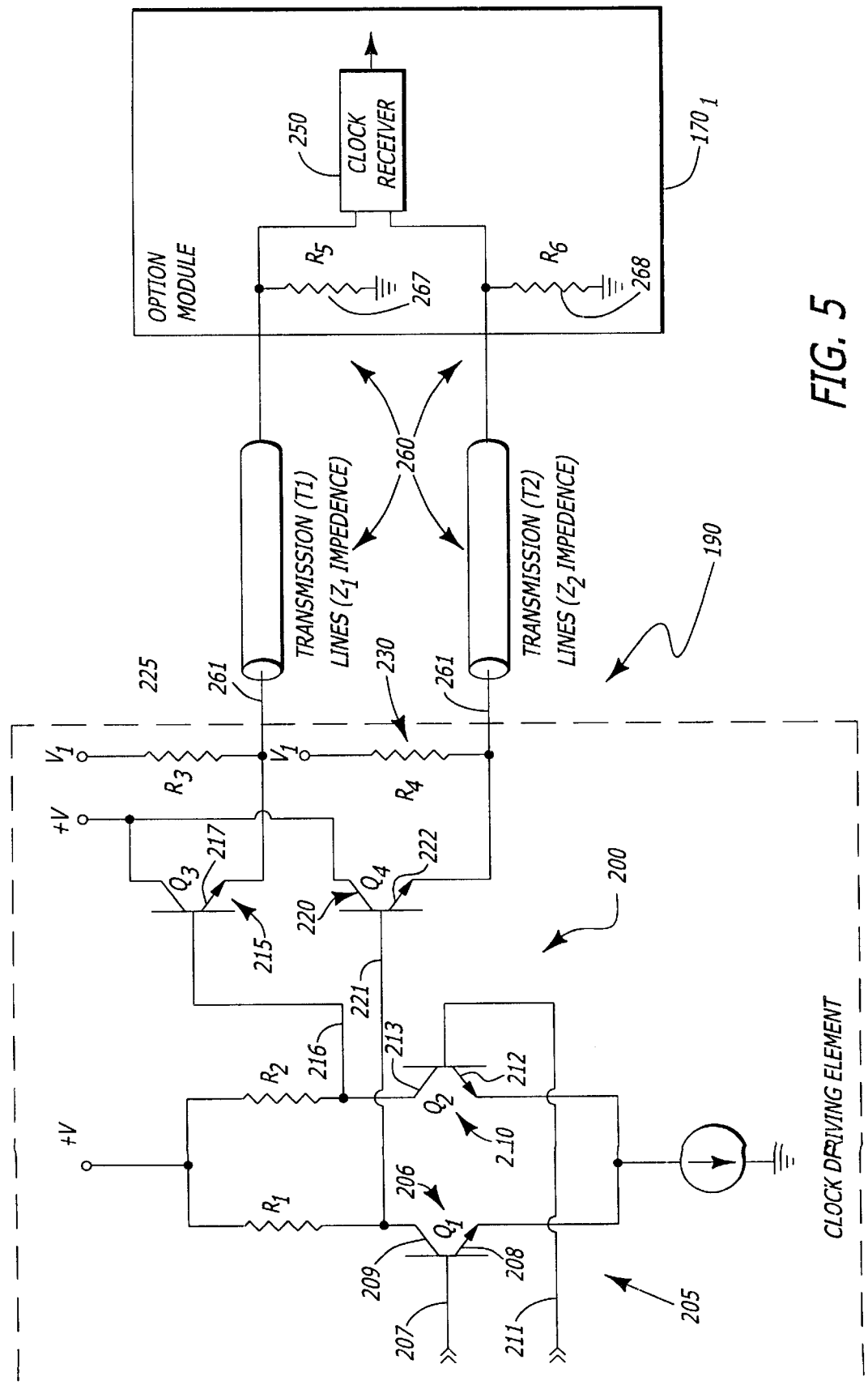
FIG. 5 is a detailed schematic diagram of a first embodiment of the clock driving element of FIG. 4 including a differential clock driver.

Referring to FIG. 5, a schematic diagram of the selective clock circuit 190 is shown. The clock driver 200 includes a dual input, differential amplifier 205 coupled to a plurality of emitter-follower transistors 215 and 220 which transfer clock information to the option module $170_1$. The differential amplifier 205 includes a pair of transistors 206 and 210 operating in a complementary manner. The pair of transistors include a first transistor 206 including a base 207, emitter 208 and collector 209 and a second transistor 210 including a base 211, emitter 212 and collector 213. Collectors 209 and 213 of the first and second transistors 206 and 210 are connected to bases 216 and 221 of the emitter-follower transistors 215 and 220, respectively.

The bases 216 and 221 of the emitter-follower transistors 215 and 220 receive complementary system clock signals from the differential amplifier 205. The emitter-follower transistors 215 and 220 route complementary system clock signals to the option module $170_1$ when the option module $170_1$ is coupled to the first segment 261 of transmission line(s) 260. More specifically, the emitter-follower transistors 215 and 220 may operate as current amplifiers to provide enough current to the clock receiver 250 while still charging capacitance of the transmission line. The termination resistors 267 and 268 are used to reduce reflections on the transmission lines 260 as well as for DC-biasing. Preferably, the termination resistors 267 and 268 have respective resistances "$R_5$" and "$R_6$" which are generally equal to the "$Z_1$" and "$Z_2$" impedances, respectively.

In the event that the option module $170_1$ is decoupled from first segment 261 of transmission line 260, the pull-up resistors 225 and 230, having resistances of "$R_3$" and "$R_4$" substantially greater than $Z_1$ and $Z_2$, raise the voltage applied on the emitters 217 and 222 of the emitter-follower transistors 215 and 220 above the voltage applied to the bases 216 and 221, respectively. As a result, the emitter-follower transistors 215 and 220 are turned off. This reduces EMI within the electronic system employing the option module $170_1$ and sensitive clock circuit 190. Otherwise, the pull-up resistors 225 and 230 have no effect.

Figure 6:
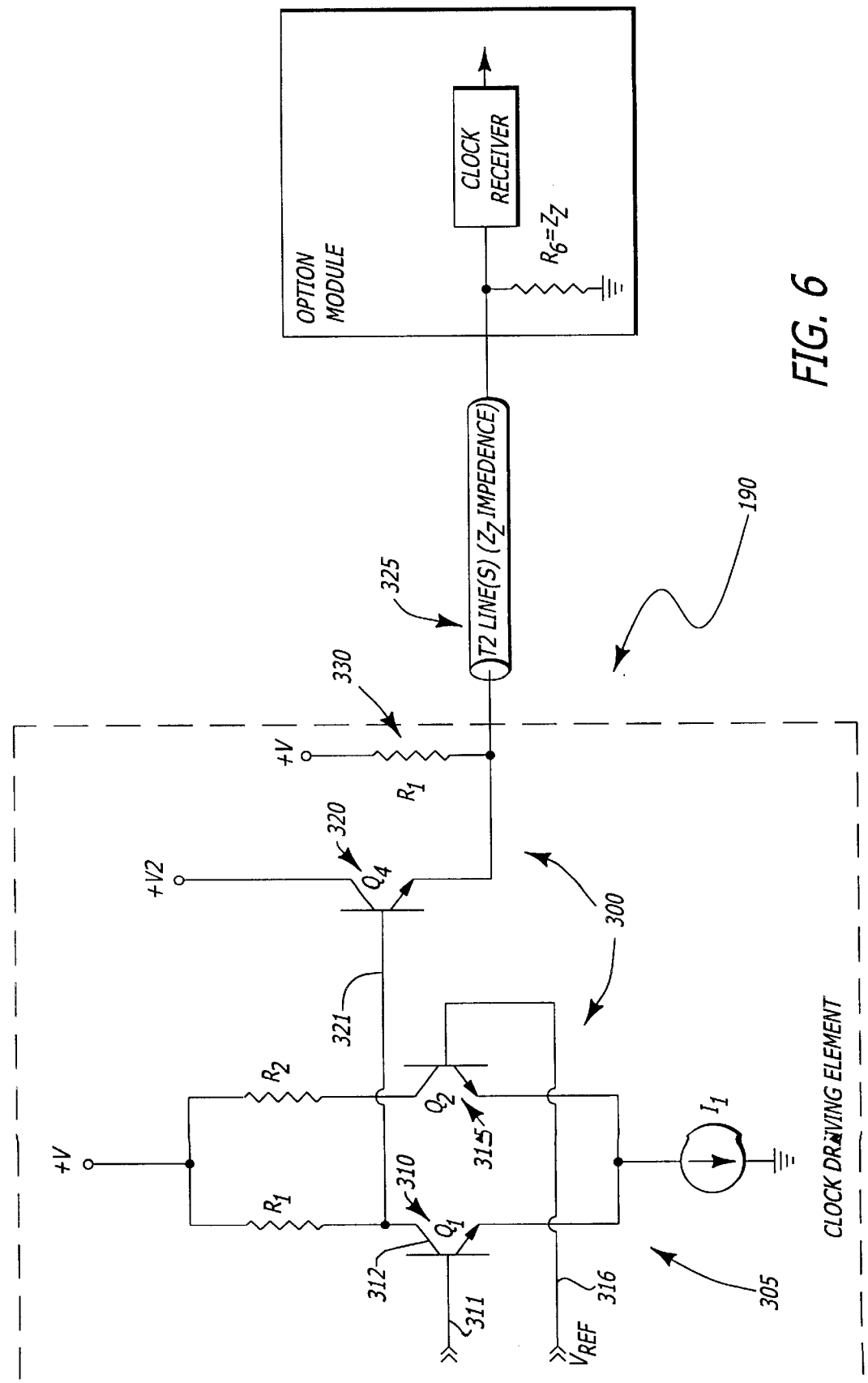
FIG. 6 is a detailed schematic diagram of a second embodiment of the clock driving element of FIG. 4 including a single ended clock driver.

Referring now to FIG. 6, a detailed schematic diagram of the selective clock circuit 190 employing a single ended clock driver 300 is shown. The clock driver 300 includes a single-input, differential amplifier 305 in which a base 311 of the first transistor 310 receives the system clock signal while a base 316 of the second transistor 315 receives a predetermined voltage ("$V_{ref}$"). $V_{ref}$ is selected so that there will be positive and negative voltage differences between $V_{ref}$ and the voltage of the system clock signal as it oscillates.

The collector 312 of the first transistor 310 is coupled to the base 321 of an emitter-follower transistor 320. The collector and emitter of the emitter-follower transistor 320 are coupled to a voltage reference "$V_2$" (e.g., positive voltage for PECL logic, or generally ground for ECL logic) and the transmission line 325, respectively. A pull-up resistor 330 is coupled to the transmission line 325 and the voltage reference in order to turn off the emitter-follower transistor 320 when the option module is removed (e.g., when the connection between the option module $170_1$ and the transmission line(s) 325 is disconnected). The emitter-follower transistor 320 is turned off by raising the voltage at the emitter of the emitter-follower transistor 320 to exceed the voltage applied to its base 321. Otherwise, when the option module $170_1$ is coupled to the transmission lines 325, the pull-up resistor 330 has no effect.

Figure 7:
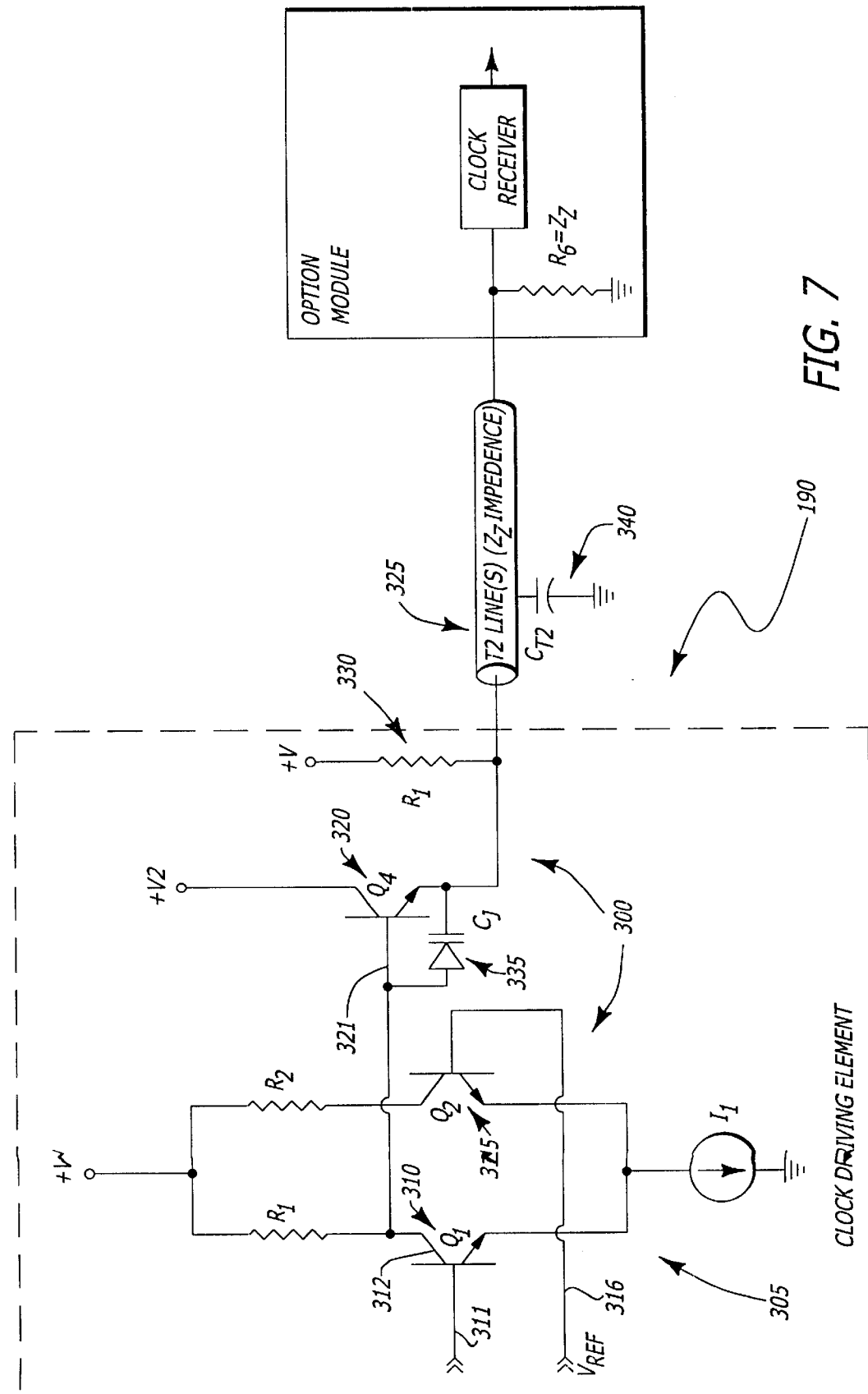
FIG. 7 is a detailed schematic of a third embodiment of the clock driving element of FIG. 4 including a varactor diode reducing base-emitter junction capacitance.

Referring to FIG. 7, a more-detailed embodiment of the clock driving element of FIG. 6 is shown. A varactor diode 335 (normally parasitic in nature) is implemented at the base-emitter junction of emitter-follower transistor 320 of FIG. 6 as well as the emitter-follower transistors 215 and 220 of FIG. 5. The pull-up resistor 330 reverse biases the base-emitter junction causing the transistor 320 to turn-off when the option module is not connected to the first segment of the transmission line(s). In addition, the pull-up resistor 330 biases the varactor diode in a way to reduce the capacitance ("$C_j$") at the base-emitter junction. The voltage divider being $C_j/C_{T2}$, where "$C_{T2}$" is equal to the total capacitance along the transmission line(s) 325, transfers a reduced amplitude signal to the transmission line(s) further reducing EMI.

Figure 8:
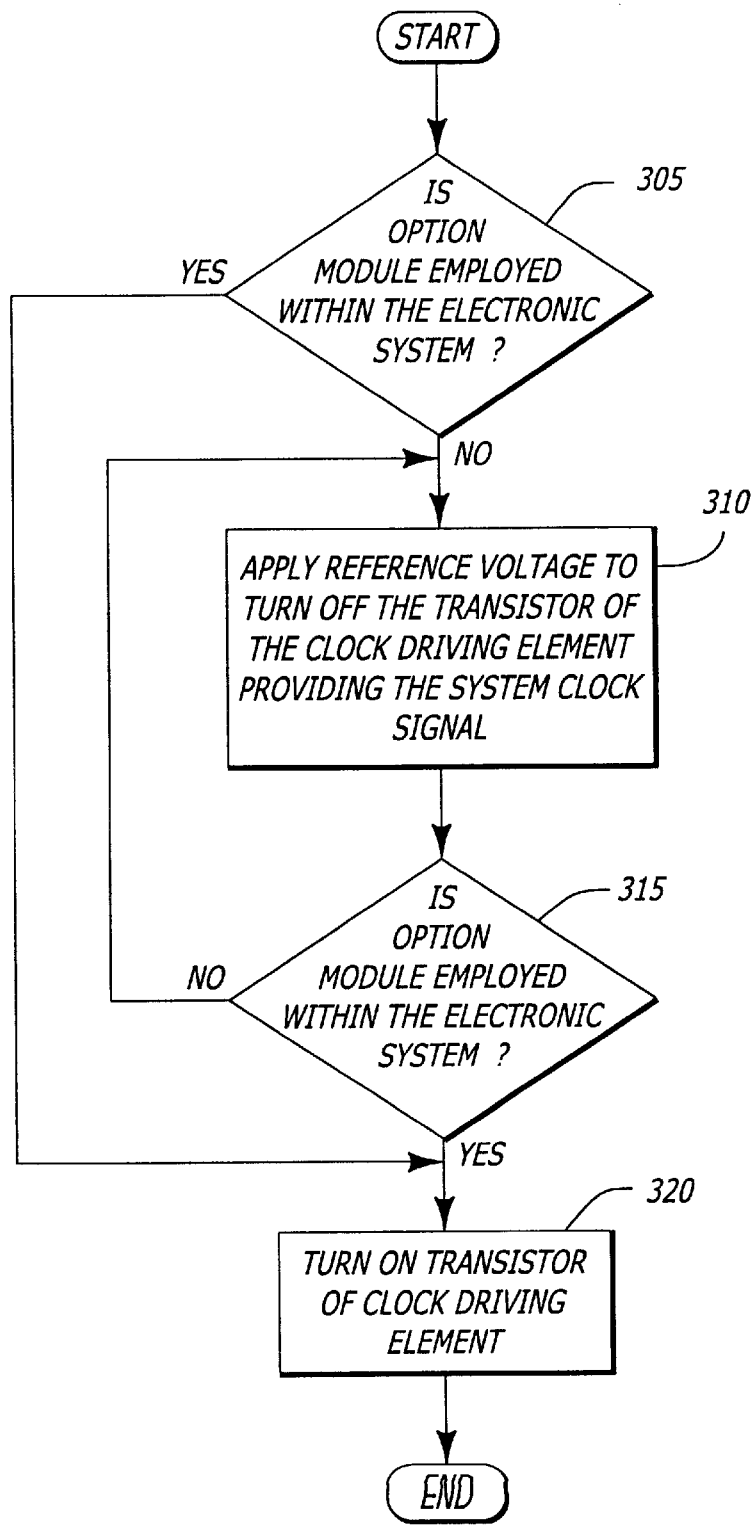
FIG. 8 is a flowchart of an illustrative embodiment of the operational steps performed by the selective clock circuit of FIG. 4.

Referring to FIG. 8, the communication scheme used by the selective clock circuit is shown below. Basically, as mentioned above, the clock receiving element, operating as a "slave" device is implemented onto each of the option modules. A clock driving element operating as a "master" device by providing system clock signals to the clock receiving element of the option modules coupled thereto. The transmission lines remain terminated. Next, upon detecting that the option module is decoupled from the clock driving element, the pull-up resistor of the clock driving element applies the predetermined voltage to an emitter-follower transistor to turn off the transistor (Steps 405 and 410). As a result, the predetermined voltage deactivates the transmission lines until a coupling with the option module is re-established (Step 415). Then, the emitter-follower transistor is turned on (Step 420). This process would continue repeatedly for the coupling or decoupling of option modules.

To one skilled in the art, alternative embodiments of the invention will be apparent. The preferred embodiment provided is merely for illustrative purposes and should not be taken as limiting the scope of the invention as claimed. Clearly, other embodiments are conceivable such as different voltage levels for different types of products.

What is claimed is:

1. A clock circuit comprising:
   at least one transmission line;
   a clock receiving element removably coupled to said at least one transmission line; and
   a clock driving element coupled to said at least one transmission line, said clock driving element for substantially prohibiting transmission of a clock signal over said at least one transmission line when said clock receiving element is decoupled from said at least one transmission line and said at least one transmission line is not terminated, the clock driving element including a clock driver coupled to said at least one transmission line, said clock driver including (i) at least one transistor including a base to receive a first voltage associated with said clock signal and an emitter coupled to said at least one transmission line, and (ii) a varactor diode coupled to said base and said emitter, and
   at least one pull-up resistor coupled between a voltage reference supplying a second voltage and said at least one transmission line, said at least one pull-up resistor biasing said varactor diode and applying said second voltage to said emitter of said at least one transistor to turn off said at least one transistor when said clock receiving element is decoupled from said at least one transmission line.

2. The clock circuit according to claim 1, wherein said at least one pull-up resistor has a resistance substantially greater than a characteristic impedance of said at least one transmission line.

3. The clock circuit according to claim 1, wherein said clock driver includes Emitter Coupled Logic.

4. The clock circuit according to claim 1, wherein said clock driver includes Positive Emitter Coupled Logic.

5. The clock circuit according to claim 1, wherein said clock driver further includes
   an amplifier including a first transistor and a second transistor, said first transistor including a collector, an emitter and a base to receive said at least one clock signal, and said second transistor includes a base upon which a predetermined voltage reference is applied, wherein said collector of said first transistor is coupled to said base of said second transistor.

6. The clock circuit according to claim 1, wherein said clock driver further includes
   an amplifier including a first transistor having a base receiving a first clock signal of said at least one clock signal and a second transistor having a base receiving a second clock signal of said predetermined voltage reference.

7. The clock circuit according to claim 6, wherein said at least one transmission includes a third transistor having a base coupled to a collector of said first transistor and an emitter coupled to a first transmission line of said at least one transmission line, and a fourth transistor having a base coupled to a collector of said second transistor and an emitter coupled to a second transmission line of said at least one transmission line.

8. A computer system comprising:
   a removable option module including
      a second line segment partially forming a transmission line, and
      a clock receiving element coupled to said transmission line; and
   a circuit board coupled to said option module, the circuit board including
      a first line segment partially forming said transmission line, and
      a clock driving element coupled to said first line segment, said clock driving element substantially prohibiting said at least one clock signal from being propagated over said first and second line segments upon detecting that said option module is decoupled from said circuit board causing said first line segment to be non-terminated.

9. The computer system according to claim 8, wherein said clock driving element of said circuit board includes a clock driver coupled to said first line segment, said clock driver including (i) at least one transistor including a base to receive a first voltage associated with said at least one clock signal, and an emitter coupled to said transmission line, and (ii) a varactor diode coupled to said base and said emitter.

10. The computer system according to claim 9, wherein said clock driving element of said circuit board includes at least one resistor coupled between a voltage reference supplying a second voltage and said transmission line, said resistor biasing said varactor diode and applying said second voltage to said emitter of said at least one transistor to turn off said at least one transistor when said clock receiving element is decoupled from said transmission line.

11. The computer system according to claim 10, wherein said at least one resistor has a resistance substantially greater than a characteristic impedance of said transmission line.

12. The computer system according to claim 9, wherein said clock driver is implemented with Emitter Coupled Logic.

13. The computer system according to claim 9, wherein said clock driver is implemented with Positive Emitter Coupled Logic.

14. The computer system according to claim 9, wherein said clock driver includes
   an amplifier including a first transistor and a second transistor, said first transistor including a collector, an emitter and a base that receives said at least one clock signal, and said second transistor includes a base that receives a predetermined voltage reference,
   wherein said collector of said first transistor is coupled to said base of said at least one transistor.

15. The computer system according to claims 9, wherein said clock driver includes
   an amplifier including a first transistor having a base receiving a first clock signal of said at least one clock signal, and a second transistor having a base to receive a second clock signal of said predetermined voltage reference, wherein said at least one transistor includes a third transistor having a base coupled to a collector of said first transistor and an emitter coupled to a first transmission line of said transmission line, and a fourth transistor having a base coupled to a collector of said second transistor and an emitter coupled to a second transmission line of said transmission line.

16. A clock circuit comprising:
   at least one transmission line;
   a clock receiving element removably coupled to said at least one transmission line; and
   a clock driving element coupled to said at least one transmission line, said clock driving element to substantially prohibit transmission of a clock signal over said at least one transmission line when said clock receiving element is decoupled from said at least one transmission line and said at least one transmission line is not terminated.

17. A clock circuit for controlling propagation of clock signals to a removable option module, the clock circuit comprising:

a transmission line;

a pull-up resistor coupled to said transmission line;

a transistor including a base for receiving a clock signal, a collector, and an emitter coupled to said transmission line, said transistor being turned off by said pull-up resistor raising a voltage at said emitter greater than an amplitude voltage of said clock signal in response to the removable option module being decoupled from said transmission line so that said transmission line is not terminated and said clock signal is prevented from being propagated over said transmission line.

18. The clock circuit according to claim 17, wherein said pull-up resistor has no effect on said transistor when the removable option module is coupled to said transmission line.

* * * * *